United States Patent [19]

Franci et al.

[11] Patent Number: 5,389,999
[45] Date of Patent: Feb. 14, 1995

[54] PHOTOPRINTER FOR CUTTING & DEVELOPING VARIOUS DIMENSIONED PRINTS FROM CONTINUOUS STRIP LIGHT-SENSITIVE PAPER

[75] Inventors: Giosué Franci; Luciano Malisan, both of Pordenone, Italy

[73] Assignee: San Marco Imaging S.r.l., Pordenone, Italy

[21] Appl. No.: 165,903

[22] Filed: Dec. 14, 1993

[30] Foreign Application Priority Data

Dec. 15, 1992 [IT] Italy .................. 92A 000092

[51] Int. Cl.$^6$ ............................................. G03B 29/00
[52] U.S. Cl. ............................................. 355/28; 355/29
[58] Field of Search ............... 355/28, 29; 354/298

[56] References Cited

U.S. PATENT DOCUMENTS

| | | | |
|---|---|---|---|
| 3,746,444 | 7/1973 | Kahle et al. | 355/28 |
| 4,576,469 | 3/1986 | Shiga et al. | 355/29 |
| 4,655,583 | 4/1987 | Kitai et al. | 355/29 |
| 4,705,376 | 11/1987 | Schaub et al. | 354/298 |
| 4,931,826 | 6/1990 | Lucht et al. | 355/28 |
| 4,959,683 | 9/1990 | Otake et al. | 355/28 |

Primary Examiner—Richard A. Wintercorn
Attorney, Agent, or Firm—Wenderoth, Lind & Ponack

[57] ABSTRACT

A device for application to photographic printing machines, by which sheets of light-sensitive paper cut from strip are advanced and positioned at a print station and then transferred to a successive developing machine, wherein the device (5) affording the printing surface is capable of traversing movement in the transverse direction, supported slidably on suitable guides and translated along the guides by drive means activated by means controlled in turn by means capable of sensing and determining an exact selected position, all of which conventional, the alternating transverse movements of the device (5) affording the printing surface being such that sheets of light-sensitive paper (A1, B1, C1, D1) exhibiting width less than half the working width of the maximum print size handled by the machine are transferred after printing directly to the successive developing machine arranged in alternation and in co-ordinated sequence on two or more parallel conveying lanes.

1 Claim, 3 Drawing Sheets

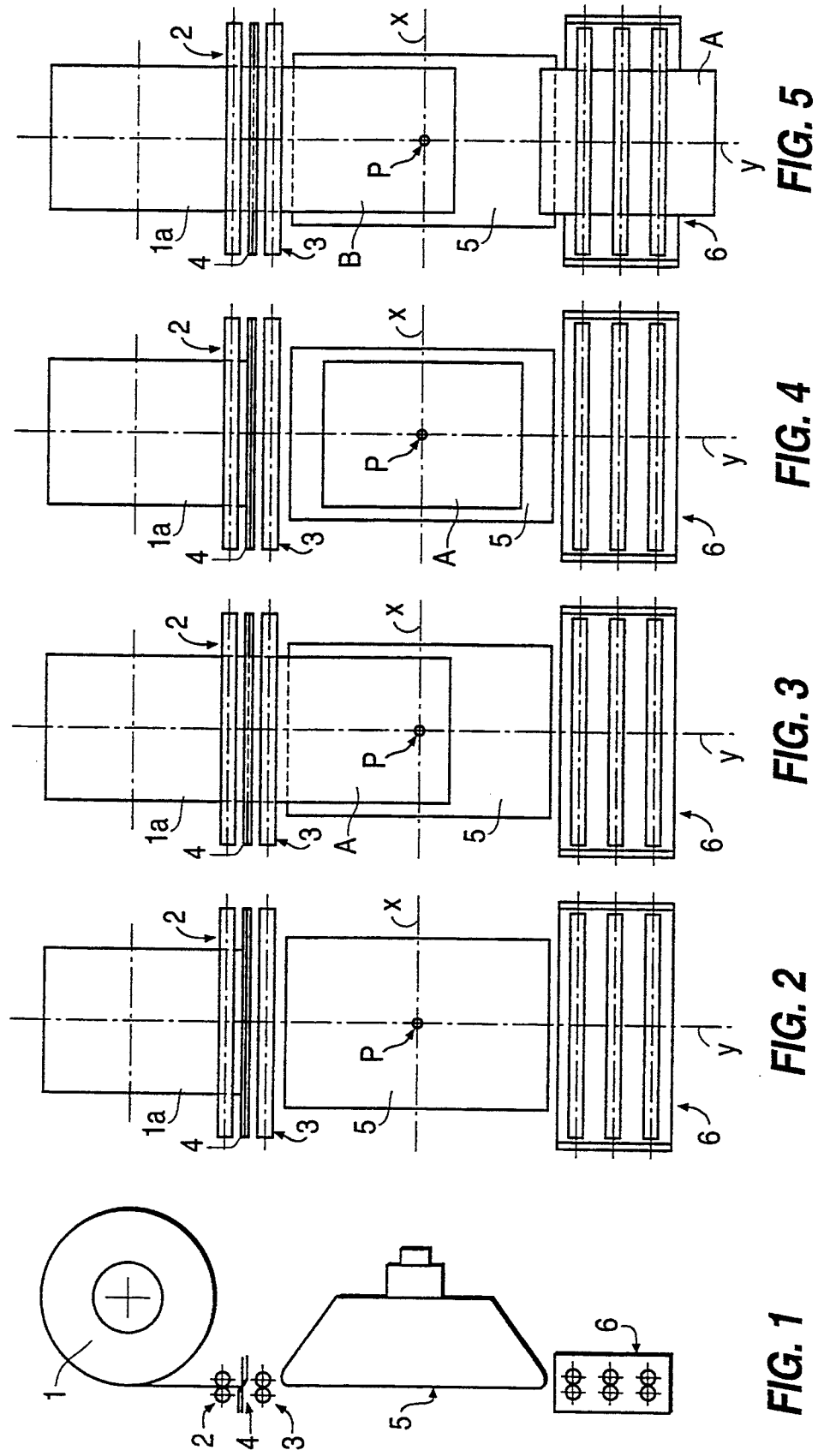

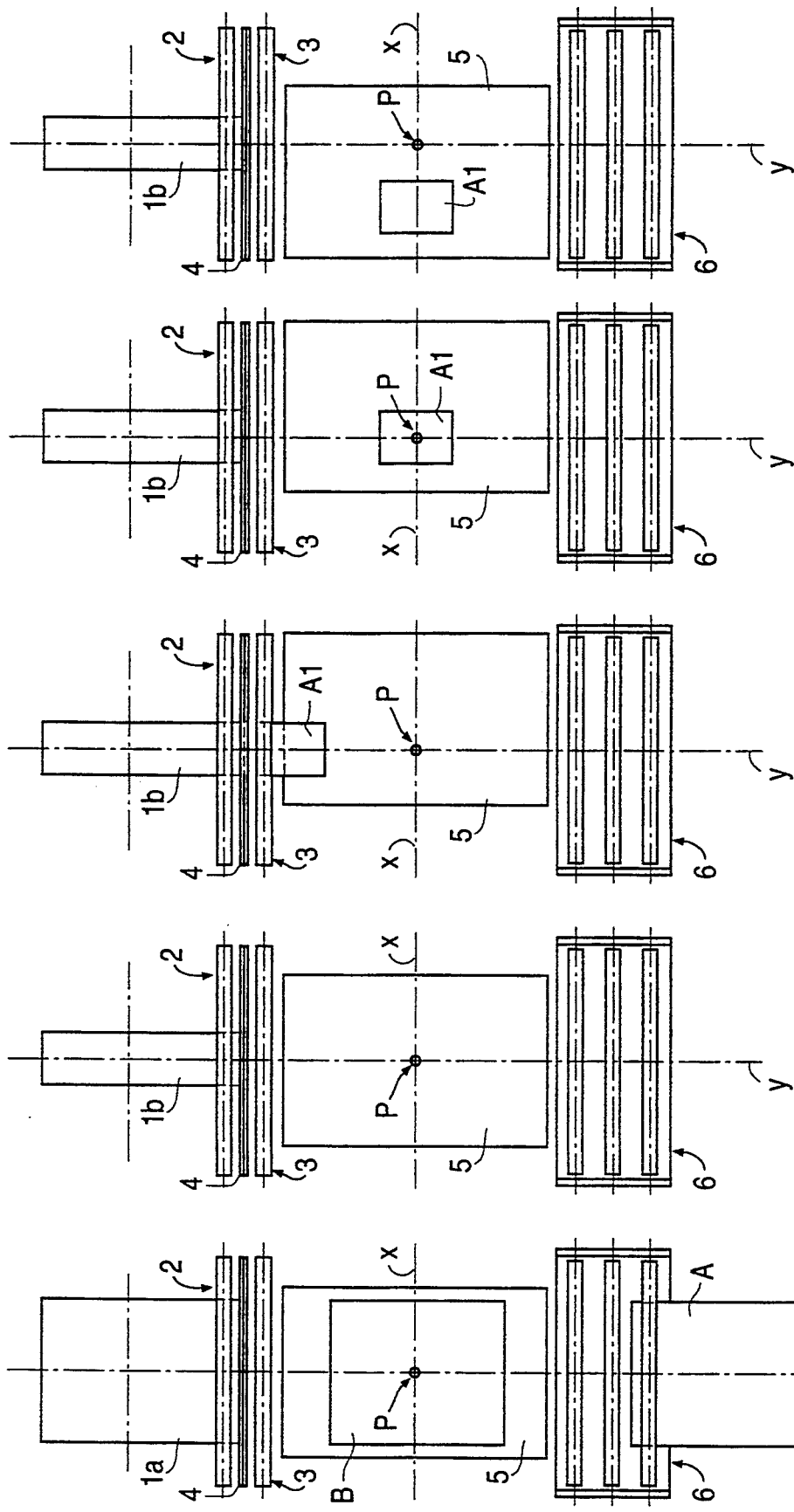

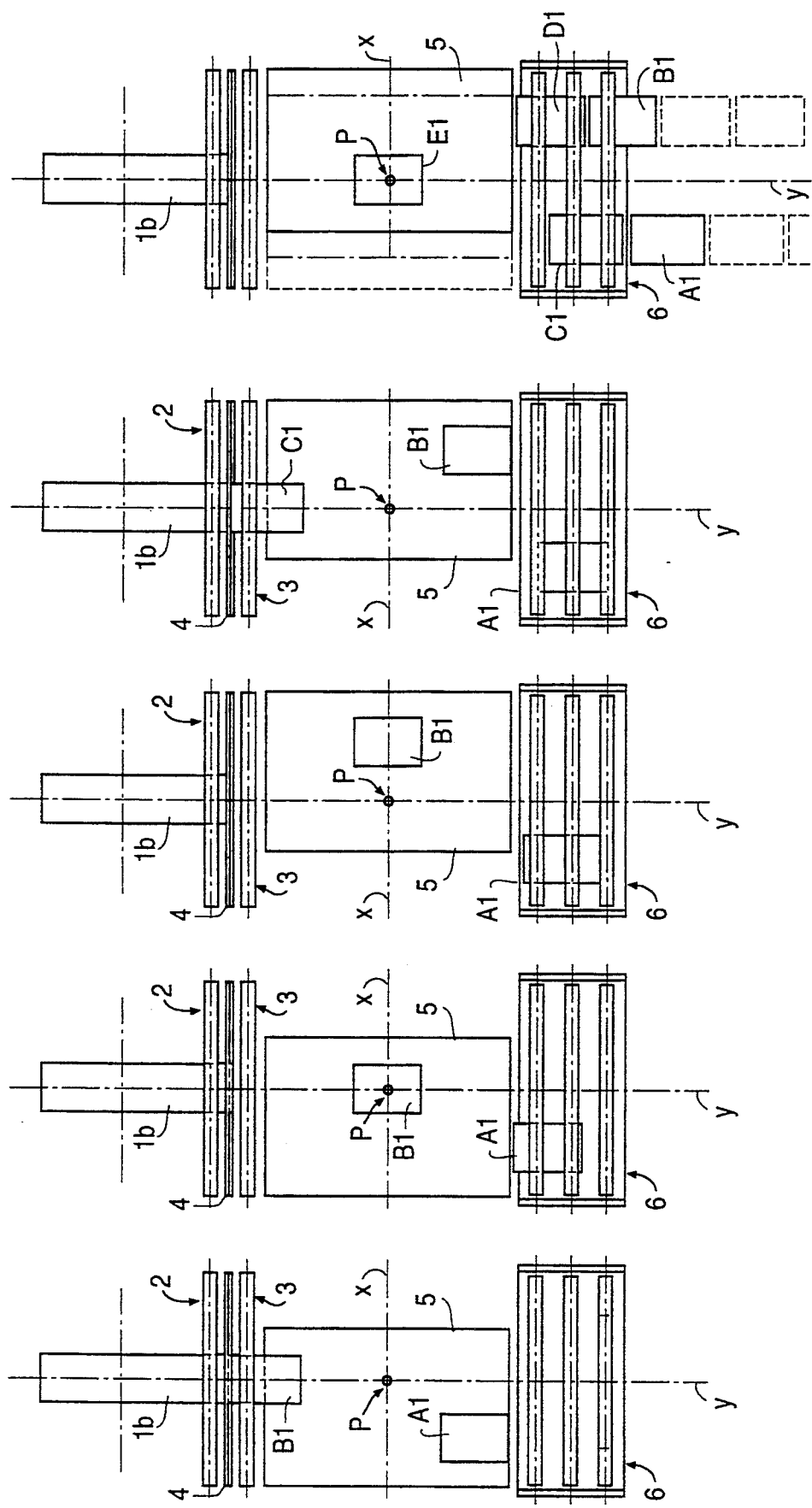

PHOTOPRINTER FOR CUTTING & DEVELOPING VARIOUS DIMENSIONED PRINTS FROM CONTINUOUS STRIP LIGHT-SENSITIVE PAPER

The present invention relates to a new and simple device by which single sheets of light-sensitive paper in various sizes are fed forward and positioned at a photographic print station, and advanced thereafter to the successive developing and drying stages.

The art field of photography embraces special machines developed for industrial use, by which the process of printing photograms from film onto light-sensitive paper is carried out automatically.

In typical machines, a continuous strip of unexposed light-sensitive paper decoiled from a supply reel is directed toward a printing surface consisting normally in a vacuum device of conventional embodiment, and cut into single sheets of selected length by a guillotine; the discrete lengths of unexposed paper are advanced and disposed in an exact print position, whereupon the image of a photogram captured on film is projected onto each corresponding sheet in such a way as to leave an impression in the conventional manner. Thereafter, the exposed sheet is transferred to a successive developing machine in which the image is fixed and the paper dried likewise in conventional fashion, thereby obtaining a photograph.

Normally speaking, machines of the type in question are constructed and set up in such a manner as to handle different photographic print sizes, and more exactly a large or maximum size, for example 30×45 cm, or even 50×70 cm, as well as the smaller sizes encountered typically in amateur photography, including 13×18 cm or 10×15 cm, or even 9×13 cm and others besides.

To accommodate the different sizes, the machine usually incorporates a transfer unit positioned preceding or preferably following the printing surface typically afforded by the aforementioned vacuum device, by means of which the smaller print sizes, or at least those print sizes significantly smaller than the maximum, are directed following exposure onto two or more lanes in alternation and advanced to the developing and drying stages positioned in such a way as to pass through the relative developing tanks and drying enclosure in two or more corresponding files.

Naturally enough, the inclusion of the transfer unit dictates the occupation of a certain amount of space; being a self-contained and relatively complex assembly, moreover, the transfer unit must be constructed as a separate item of equipment, which signifies preparing and putting together a substantial number of components and sustaining the relative production costs that such a procedure entails, all of which clearly has bearing on the ultimate cost of the printing machine overall.

The object of the present invention, namely to overcome the drawbacks in question, is realized in a device of which the features and advantages are set forth by way strictly of example and with no limitation implied in the following specification and in the claims appended thereto, with reference to the accompanying drawings, which afford a schematic illustration of the essential elements of the print station only and show the various operating steps performed by the station with different sizes of paper sheet; more exactly;

FIG. 1 is a schematic side elevation illustrating the arrangement of the essential parts of a print station according to the present invention;

FIGS. 2 to 6 are also schematic illustrations, showing the various processing steps in the case of a large or maximum size sheet of light-sensitive paper;

FIGS. 7 to 15 are further schematic illustrations again showing the various processing steps, in the case of a small size sheet of light-sensitive paper.

Referring to the drawings, in which identical parts are indicated by a common number, the following essential elements are illustrated: a reel of light-sensitive paper 1 which, in the interests of clarity, is denoted by the additional letter "a" in the case of paper for a maximum size of print, as illustrated in FIGS. 2 to 6, and by the additional letter "b" in the case of a small size print, as illustrated in the successive figures; a first pair of rollers 2 and a second pair of rollers 3 serving to advance a predetermined length of the strip of light-sensitive paper 1a or 1b, decoiled from the reel; a guillotine 4 located between the first pair of rollers 2 and the second pair of rollers 3, activated in such a way as to cut the strip of light-sensitive paper 1a or 1b into selected lengths and thus produce single sheets utilized in subsequent steps to obtain an end product (photographic prints); a printing surface, which in the case of the example illustrated consists in a conventional vacuum device 5 disposed in such a manner as to advance and position a relative sheet of light-sensitive paper during the various steps of the exposure process: and finally a flow accumulator 6 consisting in a suitably embodied plurality of rollers positioned beyond the vacuum device 5 along the feed direction, by which the sheet of light-sensitive paper is taken from the device 5 and transferred to the successive steps of the process (developing, drying).

Also indicated in the drawings are two optical axes x and y, transverse and longitudinal respectively, and their point of intersection P, on which to centre the image projected in conventional manner from a suitable projector, likewise conventional in embodiment and therefore not illustrated.

The design, embodiment and operation of the vacuum device 5 are conventional, and therefore not described in detail. In accordance with the present invention, the printing surface afforded by the vacuum device 5 does not occupy a fixed position as in conventional solutions, but is mounted on transverse guides (which might be embodied and disposed in any one of a wide variety of ways and are therefore not illustrated) and this translatable symmetrically in a direction normal to the longitudinal optical axis y The resulting lateral movement of the device 5 might be produced by means of suitable mechanical systems such as a rack connected rigidly to the device and meshing with a pinion driven by an electric motor, preferably a stepping motor, or other conventional systems of any given type; accordingly, in the interests of simplicity and clarity, no such system is illustrated.

The first pair of rollers 2, second pair of rollers 3 and vacuum device 5 are controlled independently of one another, albeit the peripheral velocities of the first pair of rollers 2 and the second pair of rollers 3 and the surface velocity of the feed belts of the vacuum device 5 are identical and, moreover, advantageously greater than the peripheral velocities of the rollers of the flow accumulator 6, which are matched to the rate of feed at which the sheets of light-sensitive paper are transferred to the successive developing and drying stages; more exactly, the rollers of the flow accumulator 6 will be interconnected by the respective shafts in such a way that their peripheral velocities coincide with the rate of feed at which the sheets of light-sensitive paper are taken through the developing tanks and drying enclosure, and to this end, coupled by means of suitable freewheel devices designed to ensure that the sheets of paper emerging from the preceding vacuum device 5, and proceeding at greater velocity as aforementioned, are able to penetrate gradually between each pair of rollers without hindrance.

The operation of a device thus embodied will now be described.

FIGS. 2 to 6 illustrate the succession of processing steps implemented in the case of the maximum size sheet of light-sensitive paper which can be processed by the machine.

In FIG. 2, the strip of light-sensitive paper 1a is shown with the end pinched between the first pair of rollers 2 only and the leading edge coinciding with the cutting line of the guillotine 4, any initial excess having already been trimmed.

When the machine is activated, the rollers of the flow accumulator 6 are set in rotation at an appropriate angular velocity, which will be identical to the rate of feed at which the exposed sheets of paper progress through the successive developing and drying stages.

In a first step of the operating cycle, the first and second pairs of rollers 2 and 3 and the feed belts of the vacuum device 5 are set simultaneously in rotation.

The strip advances a suitable distance, as illustrated in FIG. 3, to the point at which movement is caused to cease by appropriate length sensing means, whereupon the guillotine 4 will be activated and a first sheet A of the light-sensitive paper is cut.

Following the cut, the second pair of rollers 3 and the feed belts of the vacuum device 5 are set in rotation in such a way that the sheet A is carried forward to the point of occupying the exact printing position, as illustrated in FIG. 4, and movement is again caused to cease by further sensing means.

Thus positioned, the sheet A of paper is exposed in conventional manner so as to receive the image from a film mounted in a suitable projector.

The cycle of FIG. 3 now repeats, in such a way that a further length of the strip of light-sensitive paper is advanced and cut to form a second sheet B, as shown FIG. 5.

At the same time, the previous sheet A, carried forward thus far exclusively by the feed belts of the vacuum device 5, advances to the point of penetrating between the rollers of the flow accumulator 6. The second sheet B advances toward and centres on the printing position an illustrated in FIG. 6, whilst the first sheet A is carried forward by the rollers of the flow accumulator 6 and begins its progress through the successive developing machine.

Thereafter, a continuous succession of new cycles will result in these same steps being repeated.

As clearly discernible from FIGS. 1 to 6 referred to above, the vacuum device 5 remains in a stationary position throughout the process as described thus far.

This completes the description pertinent to operation of the device using a strip of light-sensitive paper 1a suitable for producing larger or maximum size prints and attention may now be given to operation utilizing a strip of light-sensitive paper 1b for smaller sizes. Initially, as illustrated in FIG. 7, the vacuum device 5 occupies a central position, and the reel carrying the narrow strip of paper 1b is disposed in alignment with the longitudinal optical axis y.

As in the first step described with reference to the strip of light-sensitive paper 1a for a maximum size of print, the end of the narrower strip of light-sensitive paper 1b is pinched between the first pair of rollers 2 only, again with the leading edge on the cutting line of the guillotine 4, and again with any initial excess having been trimmed already.

At this point the vacuum device 5 is repositioned as indicated in FIG. 8, caused by conventional means to slide laterally along suitable transverse guides and halted in the correct position through the agency of sensing means likewise conventional. The first and second pairs of rollers 2 and 3 and the feed belts of the vacuum device 5 are now set in motion so as to advance the strip 1b through a predetermined distance, and in effect to the point at which movement is caused to cease by appropriate length sensing means, again of conventional embodiment.

The guillotine 4 is activated and a first sheet A1 thus cut from the strip.

Whilst the movement of the vacuum device 5 is shown as being to the right in FIG. 8, the same effect obviously might be achieved with a movement to the opposite side.

The second pair of rollers 3 and the feed belts of the vacuum device 5 are again started up, with the result that the previously cut sheet A1 is directed forward to the point of occupying the exact printing position as illustrated in FIG. 9, and movement is again caused to cease by further sensing means.

Thus positioned, the first sheet A1 can be exposed in the conventional manner, whereupon the vacuum device 5 is traversed laterally to the opposite side of the longitudinal axis y and repositioned as illustrated in FIG. 10, its correct placement being ensured by further sensing means.

As a consequence of this movement, the exposed first sheet A1 is also carried sideways and into alignment with a first lateral conveying lane.

The first and second pairs of rollers 2 and 3 and the feed belts of the vacuum device 5 are again set in motion, in such a way that the newly cut leading edge of the strip of light-sensitive paper 1b is caused to advance as before (see FIG. 8) through a predetermined distance, then stopped and cut by the guillotine 4 to form a second sheet B1. As will be clear from FIG. 11, the previously exposed first sheet A1 will advance simultaneously with the incoming second sheet B1 through a similar distance, toward the bottom runout end of the vacuum device 5, where it pauses momentarily.

Following the cut, the second pair of rollers 3 and the feed belts of the vacuum device 5 are once again set in motion in such a way that the second sheet B1 is taken forward in the manner of the first A1, centred on the printing position as illustrated in FIG. 12, and exposed in its turn.

The first sheet A1 is also carried further forward, as illustrated likewise in FIG. 12, to the point ultimately of quitting the vacuum device 5 and penetrating between the pairs of rollers of the flow accumulator 6, its admission allowed without difficulty by virtue of the different velocities as stated above, passing thence to the successive developing and drying stages.

The vacuum device 5 traverses again at this juncture, as discernible from FIG. 13, and is repositioned on the opposite side of the longitudinal axis y, returning as a result to the former position illustrated in FIG. 8. Accordingly, the second sheet B1 currently attached to the vacuum device 5 also moves to the side of the axis in question and onto a second lateral conveying lane parallel to the lane occupied by the first sheet A1, and at the same time, the first sheet A1 begins moving toward the successive developing and drying stages of the machine, taken up fully between the rollers of the flow accumulator 6, there now begins a third cycle, illustrated in FIG. 14., and a further portion of the strip of light-sensitive paper 1b is extended to the appropriate length and cut by the guillotine 4 to form a third sheet C1.

The second sheet B 1 in the meantime advance, toward the runout end of the vacuum device 5 and draws to a halt in a position similar to that of the first sheet A1 as indicated in FIG. 11, while the first sheet A1 itself continues toward the successive developing and drying stages, still carried forward by the rollers of the flow accumulator 6. Thereafter, the steps will be repeated cyclically in the same manner. As discernible in particular from FIG. 15, the sheets of paper A1, B1, C1, D1 advance in alternation onto two parallel lanes, remaining suitably spaced apart in both the transverse and the longitudinal directions. For additional clarity, in FIG. 15, dot phantom lines are used to indicate the relative positioning of the steady successions of exposed sheets along the two symmetrically disposed lateral conveying lanes during the operation of the machine, while dot-dash phantom lines indicate the initial centred position and the symmetrical lateral positions assumed alternately by the vacuum device 5, as described above and discernible from FIGS. 7 to 15, when processing smaller sheets of width less than half the width of the larger or maximum size sheet. In the case of machines designed to process only small size prints, as used typically in amateur photography, the printing surface afforded by the vacuum device 5 will be proportioned to accommodate and convey sheets of light-sensitive paper only of these same smaller dimensions, with the result that the device itself is rendered correspondingly more compact and the overall dimensions of the relative machine are also further reduced. In this instance, the strip of light-sensitive paper 1b will be advanced, and the cut sheets exposed to the image, when the printing surface or vacuum device is centred, i.e. disposed in coaxial alignment with the strip; thereafter, the device traverses in alternation and symmetrically to either side of the longitudinal axis in such a way an to divert and release the exposed light-sensitive sheets, of which the width is in any event less than half the overall available processing width of the successive processing machine, suitably distributed over two or more parallel lateral lanes disposed symmetrically in relation to the central feed and print axis.

This completes the detailed description relating to the operation of the device according to the invention, and attention may now be given to the advantages afforded in terms of utilization.

The solution illustrated permits in effect of avoiding the need for construction and application of a separate transfer device which in a prior art machine will serve exclusively to divert and distribute the succession of exposed sheets onto two parallel conveying lanes, in particular sheets of width substantially less than that of the maximum sheet size handled by the machine in question.

Thus, the invention affords the notable advantage of freeing the space that would otherwise be occupied by such a transfer device, signifying in turn that the dimensions of the machine can be reduced further, also of avoiding the construction and the application of a device generally complex and therefore costly by its very nature with the resulting advantage that the overall cost of the machine is similarly reduced.

It will be appreciated that variations in embodiment might be applied to the individual features of the elements making up the device to which the invention relates, without by any means abandoning the scope or the foregoing specification and the references to the accompanying drawings neither straying from within the bounds of protection afforded by the appended claims.

We claim:

1. A device for application to photographic printing machines, by which sheets of light-sensitive paper cut in various dimensions from continuous strips of various dimensions are advanced and positioned at a print station and transferred thereafter to a successive developing machine, of the type comprising: a reel (1) wound with a relative strip (1a or 1b) of unexposed light-sensitive paper exhibiting any convenient width according to the size of the photographic prints to be produced; feed means (2, 3) serving to advance the strip (1a or 1b); cutting means (4) positioned between and operating in conjunction with the feed means in such a way as to produce sheets of any given suitable length; a printing surface positioned following the cutting means in the feed direction, consisting in a suitable device (5) of vacuum or other conventional type by means of which the sheets of paper are advanced toward and positioned exactly at the print station; also diverting means positioned preceding or preferably following the vacuum device (5) in the feed direction, by which sheets (A1-B1-C1-D1-E1 ... ) of light-sensitive paper of width at least less than half the width of the largest size of print (A, B, C, D ... ) handled by the machine are diverted and distributed in alternation onto parallel conveying lanes, spaced apart one from another at a suitable distance in such a way as to allow their progress along two or more corresponding parallel paths through the successive developing and drying stages of the machine, characterized in that the vacuum device (5) affording the printing surface is disposed initially in coaxial alignment with the median axis of the advancing strip (1a or 1b) and concurrently with the longitudinal optical axis (y) of the printing machine, and capable of movement in the transverse direction in such a manner as to allow of being traversed alternately and symmetrically and to an exact selected position on either side of the axis (y), supported slidably on transversely disposed guides and set in motion along the guides by drive means of which the operation is interlocked to sensing means capable of determining the exact selected position; and in that the alternating transverse movements of the vacuum device are such that sheets of light-sensitive paper (A1, B1, C1, D1) exhibiting width less than half the working width of the successive developing machine are diverted after printing onto two or more parallel conveying lanes, in alternation and in co-ordinated sequence, thereby obtaining the distribution which in a conventional machine is obtained by the application of a self-contained and separate transfer device, while eliminating the additional dimensions and cost of such a self-contained and separate transfer device.

* * * * *